(12) United States Patent
Kim

(10) Patent No.: US 9,620,746 B2
(45) Date of Patent: Apr. 11, 2017

(54) SECONDARY BATTERY AND MANUFACTURING METHOD THEREOF

(71) Applicant: SAMSUNG SDI CO., LTD., Yongin-si, Gyeonggi-do (KR)

(72) Inventor: Ki Hyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 20 days.

(21) Appl. No.: 14/639,903

(22) Filed: Mar. 5, 2015

(65) Prior Publication Data

US 2015/0333300 A1 Nov. 19, 2015

(30) Foreign Application Priority Data

May 15, 2014 (KR) ........................ 10-2014-0058295

(51) Int. Cl.
| | |
|---|---|
| *H01M 4/00* | (2006.01) |
| *H01M 2/04* | (2006.01) |
| *H01M 10/04* | (2006.01) |
| *H01M 2/12* | (2006.01) |
| *H01M 2/34* | (2006.01) |

(52) U.S. Cl.
CPC ............ *H01M 2/043* (2013.01); *H01M 2/12* (2013.01); *H01M 2/34* (2013.01); *H01M 10/04* (2013.01); *Y10T 29/4911* (2015.01)

(58) Field of Classification Search
CPC ... B82Y 30/00; H01M 8/0662; H01M 8/0432; H01M 8/04365; H01M 8/0438; H01M 8/04552; H01M 8/04582; H01M 8/04619
See application file for complete search history.

(56) References Cited

U.S. PATENT DOCUMENTS

| | | |
|---|---|---|
| 2012/0009466 A1 | 1/2012 | Jang |
| 2012/0282494 A1 | 11/2012 | Jang |
| 2013/0029188 A1 | 1/2013 | Kim et al. |

(Continued)

FOREIGN PATENT DOCUMENTS

| | | |
|---|---|---|
| EP | 2 551 940 A2 | 1/2013 |
| KR | 10-2012-0006232 A | 1/2012 |
| KR | 10-2013-0089134 A | 8/2013 |

OTHER PUBLICATIONS

EPO Search Report dated Jul. 27, 2015, for corresponding European Patent application 15167877.8, (5 pages).

(Continued)

*Primary Examiner* — Emily Le
*Assistant Examiner* — Monique Wills
(74) *Attorney, Agent, or Firm* — Lewis Roca Rothgerber Christie LLP

(57) ABSTRACT

A method of manufacturing a secondary battery, which is capable of simplifying a processing method. The method includes preparing a cap plate that closes an opening of a case, the case accommodating an electrode assembly therein and having the opening at an end thereof, forming a short-circuit portion and a vent portion on the cap plate, performing a first heat treatment on the short-circuit portion, and performing a second heat treatment on the vent portion. The secondary battery manufactured by this method is economical because the processing method is simplified and a manufacturing cost is reduced.

17 Claims, 5 Drawing Sheets

(56) References Cited

U.S. PATENT DOCUMENTS

| | | |
|---|---|---|
| 2013/0196179 A1 | 8/2013 | Han et al. |
| 2014/0079966 A1 | 3/2014 | Byun et al. |
| 2014/0134473 A1* | 5/2014 | Frutschy ............... H01M 2/202 |
| | | 429/158 |
| 2016/0036033 A1* | 2/2016 | Zhang ................... H01M 2/345 |
| | | 429/53 |

OTHER PUBLICATIONS

European Search Report dated Jun. 27, 2016 for corresponding European Patent Application No. 15 167 877.8 (3 pages).

\* cited by examiner

SECONDARY BATTERY AND MANUFACTURING METHOD THEREOF

CROSS-REFERENCE TO RELATED APPLICATION

This application claims priority to and the benefit of Korean Patent Application No. 10-2014-0058295, filed on May 15, 2014, in the Korean Intellectual Property Office, the entire content of which is incorporated herein by reference in its entirety.

BACKGROUND

1. Field

Aspects of embodiments of the present invention relate to a secondary battery and a method of manufacturing the secondary battery.

2. Description of the Related Art in recent years, as electronics and communication industries rapidly grow, a portable electronic device (such as a camcorder, a cellular phone or a notebook computer) is coming into wide use. This leads to the increased use of a secondary battery. The secondary battery is being used (utilized) for the portable electronic device as well as medium and large sized equipment, such as an electric tool requiring high output and high power, a vehicle, a boat, a space transportation system, a motorbike, a scooter or an air transportation vehicle.

Recently, a high-output secondary battery with high-energy density using (utilizing) a non-aqueous electrolyte is being developed. The above-mentioned high-output secondary battery forms a high-capacity secondary battery by connecting a plurality of secondary batteries to each other so as to be used in driving a motor of a device requiring high power, for example, an electric vehicle.

If a short circuit occurs in the secondary battery, an overcurrent flows in the secondary battery. The continuous flow of the overcurrent generates an excessive amount of heat, thus causing the bursting and/or ignition of the secondary battery. In order to solve the problem, a short-circuit portion and a vent portion may be provided on a cap plate. Thereby, if an internal pressure of the secondary battery exceeds a preset pressure, the short-circuit portion induces the short circuit, thus interrupting the flow of a current, and the vent portion is broken, thus discharging gas generated by the excessive amount of heat.

However, the related art is problematic in that the short-circuit portion and the vent portion are separately processed and then are welded to the cap plate, so that a manufacturing cost is high and productivity is low. Therefore, there are needs to conduct various types (kinds) of suitable research into a secondary battery that is capable of reducing a manufacturing cost and improving productivity.

SUMMARY

Accordingly, aspects of embodiments of the present invention have been made keeping in mind the above problems occurring in the related art, and an aspect of an embodiment of the present invention is to provide a secondary battery, which is configured such that a short-circuit portion and a vent portion are integrated with a cap plate.

An aspect of an embodiment of the present invention is to provide a secondary battery, including a short-circuit portion and a vent portion that are lower in hardness than another portion (e.g., remaining portion) of a cap plate.

An aspect of an embodiment of the present invention is to provide a secondary battery, which makes it easy to induce a short circuit and a breakage when an internal pressure of the battery increases to be higher than a preset pressure.

An aspect of an embodiment of the present invention is to provide a method of manufacturing a secondary battery, which renders the grain size of a short circuit portion and a vent portion to be smaller than that of another portion (e.g., peripheral portion or remaining portion) of a cap plate.

An aspect of an embodiment of the present invention is to provide a secondary battery which is capable of simplifying a manufacturing (processing) method.

According to an embodiment of the present invention, there is provided a secondary battery, including an electrode assembly having a first electrode plate, a second electrode plate, and a separator interposed between the first electrode plate and the second electrode plate, a case accommodating the electrode assembly therein, the case having an opening at an end thereof (e.g., being open at a surface thereof), and a cap plate closing the opening of the case, with a vent portion and a short-circuit portion formed in set or predetermined portions of the cap plate. The vent portion and the short-circuit portion are integrated with the cap plate.

A grain size of each of the vent portion and the short-circuit portion may be larger than that of a remaining portion of the cap plate except the vent portion and the short-circuit portion.

The vent portion and the short-circuit portion may be lower in hardness than a remaining portion of the cap plate except the vent portion and the short-circuit portion.

The short-circuit portion may have a hardness of 3 to 5 $kgf/cm^2$.

The vent portion may have a hardness of 6 to 8 $kgf/cm^2$.

The vent portion and the short-circuit portion may be formed by machining the cap plate and then performing a heat treatment.

The heat treatment may be performed by an induction heating apparatus.

According to another embodiment of the present invention, there is provided a method of manufacturing a secondary battery, including preparing a cap plate that closes an opening of a case, the case accommodating an electrode assembly therein and having an opening at an end thereof (e.g., being open at a surface thereof), forming a short-circuit portion and a vent portion on the cap plate, performing a first heat treatment on the short-circuit portion, and performing a second heat treatment on the vent portion.

The short-circuit portion and the vent portion may be formed by a process selected out from a group consisting of casting, forging, rolling and pressing.

The first heat treatment and the second heat treatment may be performed by the induction heating apparatus.

The first heat treatment may be performed for 70 minutes or less (e.g., within 70 minutes) at a temperature of 400° C. to 500° C.

The second heat treatment may be performed for 70 minutes or less (e.g., within 70 minutes) at a temperature of 200° C. to 300° C.

As is apparent from the above description, the secondary battery according to an embodiment of the present invention is advantageous in that the short-circuit portion and the vent portion are integrated with the cap plate, so that a processing method can be simplified and a manufacturing cost can be reduced, and thereby the secondary battery is economical.

Further, the secondary battery according to an embodiment of the present invention is advantageous in that the short-circuit portion and the vent portion are lower in hardness than a portion of the cap plate, so that, when the internal pressure of the battery exceeds a preset pressure, the short-circuit portion and the vent portion are broken, thus interrupting the flow of a current and discharging the generated gas and thereby improving the safety of the battery.

Furthermore, the method of manufacturing the secondary battery according to an embodiment of the present invention is advantageous in that the short-circuit portion and the vent portion are subjected to heat treatment, respectively, so that the grain size and hardness thereof are smaller than those of the peripheral portion of the cap plate, and thereby the short-circuit portion and the vent portion can be rapidly and easily broken when the internal pressure of the battery exceeds the preset pressure, thus improving the safety of the battery.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The invention will be described more fully hereinafter with reference to the accompanying drawings, in which example embodiments of the inventions are shown. This invention may, however, be embodied in many different forms and should not be construed as limited to the embodiments set forth herein.

Other and further objects and features of the invention will be apparent from the following description taken in connection with the accompanying drawings.

Hereinafter, the configuration of the present invention will be described with reference to the accompanying drawings.

Figure 1:
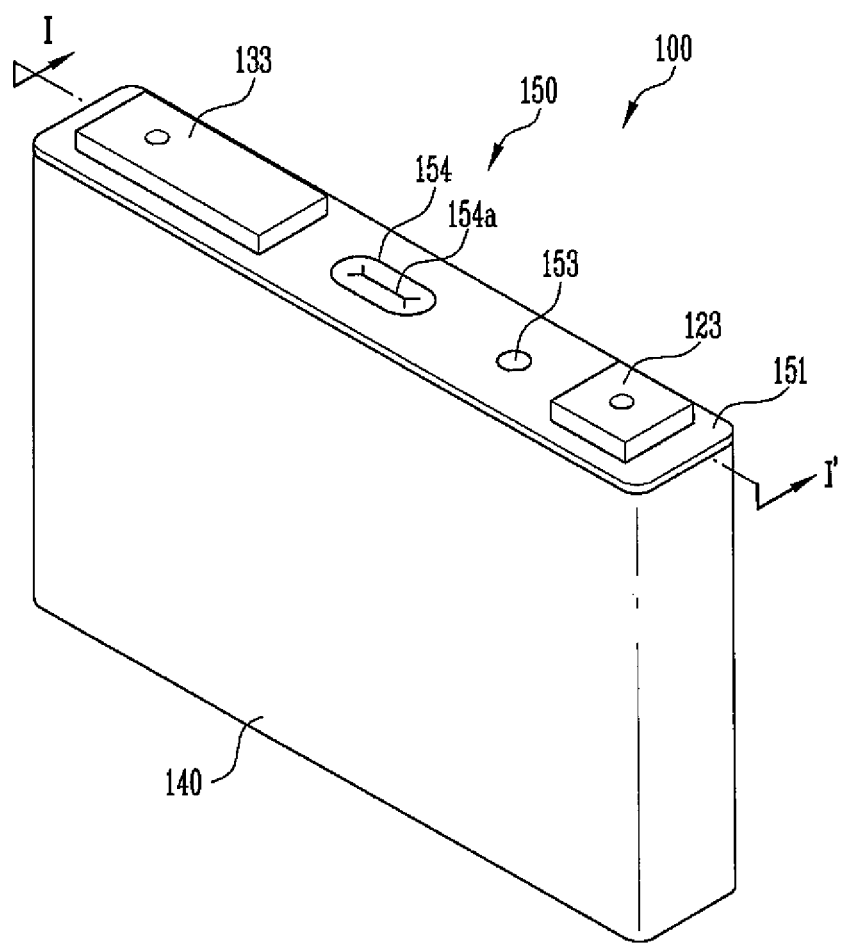
FIG. 1 is a perspective view showing a secondary battery according to an embodiment of the present invention.
Figure 2:
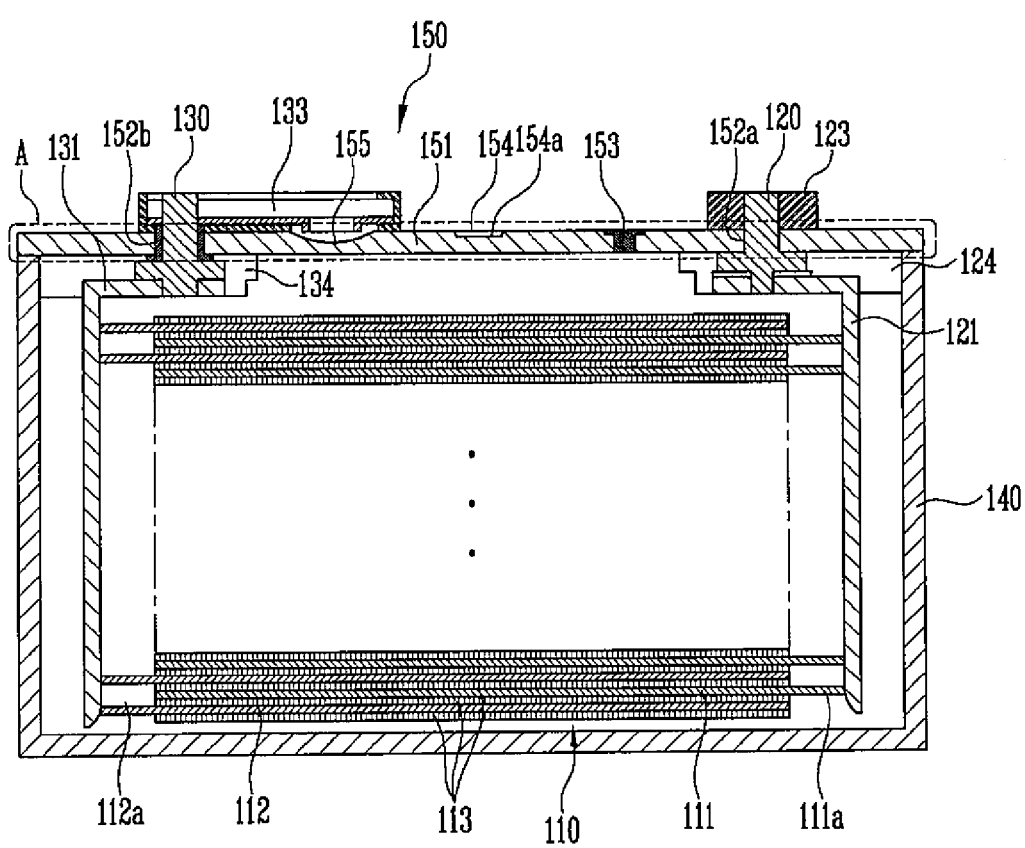
FIG. 2 is a sectional view taken along line I-I' of FIG. 1.
Figure 3:
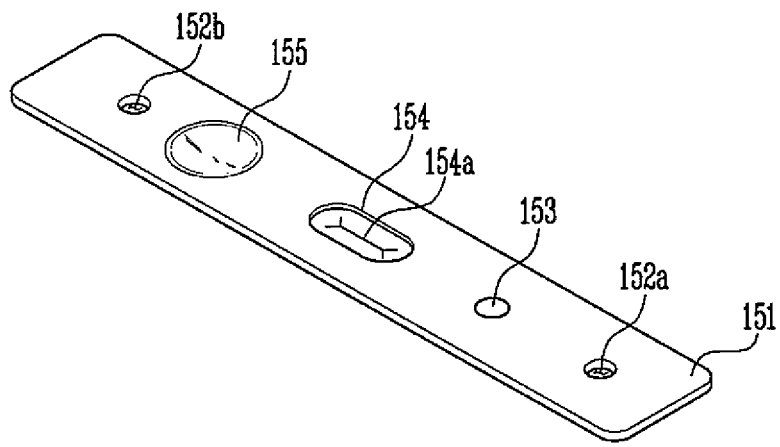
FIG. 3 is an enlarged view of portion A marked in FIG. 2.

FIG. 1 is a perspective view showing the appearance of a secondary battery 100 according to an embodiment of the present invention, FIG. 2 is a sectional view taken along line I-I' of FIG. 1, and FIG. 3 is an enlarged view of portion A marked in FIG. 2.

As shown in FIGS. 1 and 2, the secondary battery 100 includes an electrode assembly 110, a case 140, and a cap plate 151. The electrode assembly 110 includes a first electrode plate 111, a second electrode plate 112, and a separator 113 interposed between the first electrode plate 111 and the second electrode plate 112. The case 140 accommodates the electrode assembly 110 therein and has an opening at an end thereof (e.g., is open at a surface or surface end thereof). The cap plate 151 closes the opening of the case 140, with a vent portion 154 and a short-circuit portion 155 provided in set or predetermined portions of the cap plate 151. Here, the vent portion 154 and the short-circuit portion 155 are integrated with the cap plate 151.

According to the embodiment of the present invention, the vent portion 154 and the short-circuit portion 155 are not welded to the cap plate 151 after being separately formed, but are integrally formed on the cap plate 151 by performing a heat treatment subsequent to machining such as casting, forging, rolling or pressing, as shown in FIG. 3. An induction heating apparatus may be used (utilized) for the heat treatment.

In one embodiment, the heat treatment is performed at the set or predetermined portions of the cap plate 151.

The cap plate 151 may be made of aluminum and configured to have a set or predetermined hardness to allow a high current generated in the electrode assembly 110 to stably flow. That is, the cap plate 151 is configured to entirely have a robust structure of a set or predetermined hardness, but the vent portion 154 and the short-circuit portion 155 provided on a portion of the cap plate 151 are lower in hardness than another portion of the cap plate 151. For example, when the internal pressure of the battery increases due to overcharge, the vent portion 154 releases internal gas to ensure the safety of the battery. If the internal pressure of the secondary battery becomes higher than a preset pressure, the short-circuit portion 155 may be deformed by the pressure and come into contact with a second terminal plate 133, thus inducing a short circuit. In order to guarantee the stable short circuit, the second terminal plate 133 and the short-circuit portion 155 of the cap plate 151 may have different polarities. For instance, the second terminal plate 133 may be a cathode, and the short-circuit portion 155 may be an anode. A notch 154a may be further formed in a set or predetermined portion of the vent portion 154 to allow the vent portion 154 to be easily opened at a preset pressure.

In view of the above, the vent portion 154 and the short-circuit portion 155 formed in a portion of the cap plate 151 are lower in hardness than another portion (e.g., remaining portion) of the cap plate 151. Thus, if the internal pressure of the battery increases, the short circuit and breakage occur first, thus interrupting the flow of a current or discharging the internal gas. The vent portion 154 and the short-circuit portion 155 may have the strength of 6 to 8 $kgf/cm^2$ and 3 to 5 $kgf/cm^2$, respectively.

An electrolyte inlet port 153 and first and second terminal holes 152a and 152b may be further formed in the cap plate 151. The electrolyte inlet port 153 is used (utilized) to inject an electrolyte into the case 140. First and second connection terminals 120 and 130 are inserted into the first and second terminal holes 152a and 152b, respectively.

The secondary battery will be described in brief with reference to FIG. 2.

The electrode assembly 110 may be manufactured in the form of a Jelly-Roll by winding the first electrode plate 111, the second electrode plate 112 and the separator 113 that are stacked on one another, or be manufactured in the form of a stack by stacking up a plurality of first electrode plates 111, second electrode plates 112 and separators 113, or be manufactured by both winding and stacking.

The first electrode plate 111 includes a first active-material coating portion which is formed by intermittently coating a first active material on a first base material that is a sheet-shaped conductive material, and a first non-coating portion 111*a* which is not coated with the first active material so that the first base material is exposed. The first non-coating portion 111*a* may protrude to a side of the first electrode plate 111. For example, the first electrode plate 111 includes an anode plate, and the first active material may comprise an active positive polar material containing lithium, such as $LiCoO_2$, $LiNiO_2$, $LiMnO_2$, $LiMn_2O_4$ or $LiNi_{1-x-y}Co_xMn_yO_2$.

The second electrode plate 112 has a polarity that is different from that of the first electrode plate 111, and includes a second active-material coating portion which is formed by intermittently coating a second active material on a second base material that is a sheet-shaped conductive material, and a second non-coating portion 112*a* which is not coated with the second active material so that the second base material is exposed. The second non-coating portion 112*a* may protrude to a side of the second electrode plate 112. For example, the second electrode plate 112 may be a cathode plate, and the second active material may be an active negative polar material containing a carbon material such as crystalline carbon, amorphous carbon, carbon composite, carbon fiber, lithium metal or lithium alloy.

The separator 113 is positioned between the first electrode plate 111 and the second electrode plate 112, thus insulating the first electrode plate 111 and the second electrode plate 112 from each other. Further, the separator 113 allows the first electrode plate 111 and the second electrode plate 112 to exchange lithium ions. Such a separator 113 in one embodiment has a length sufficient to completely insulate the first and second electrode plates 111 and 112 from each other, even if the electrode assembly 110 contracts and expands.

The first or second base material may include metal in the form of a thin film. For example, the first base material may include aluminum, while the second base material may include copper. The first and second electrode plates 111 and 112 discharge ions into the electrolyte to cause the flow of current or electrons, and the current or electrons are transmitted through the first and second non-coating portions 111*a* and 112*a* to the outside. The first non-coating portion 111*a* may be the anode, while the second non-coating portion 112*a* may be the cathode.

The case 140 may be formed in the shape of a box, which has an opening at an end thereof (e.g., is open at a surface or surface end thereof), to accommodate the electrode assembly 110 and the electrolyte therein, the opening being closed by the cap assembly 150. Although FIG. 1 shows that the case 140 has the shape of the box, the case 140 may be manufactured to have the shape of a cylinder, a pouch or a coin, and embodiments of the present invention should not be limited to the shape of the box.

The cap assembly 150 may include the cap plate 151 that is configured to close the opening of the case 140, and the first and second terminal plates 123 and 133 disposed on the top of the cap plate 151.

The first and second terminal plates 123 and 133 may be electrically connected to the first and second non-coating portions 111*a* and 112*a* via the first and second connection terminals 120 and 130 coupled to first and second current collectors 121 and 131. Sealing gaskets, provided on the first and second connection terminals 120 and 130 and the cap plate 151 to seal gaps between the first and second connection terminals 120 and 130 or the cap plate 151 and insulation plates 124 and 124, may be further provided in the terminal holes 152*a* and 152*b* through which the first and second connection terminals 120 and 130 pass.

Hereinafter, the method of manufacturing the above-described secondary battery will be described.

Figure 4:
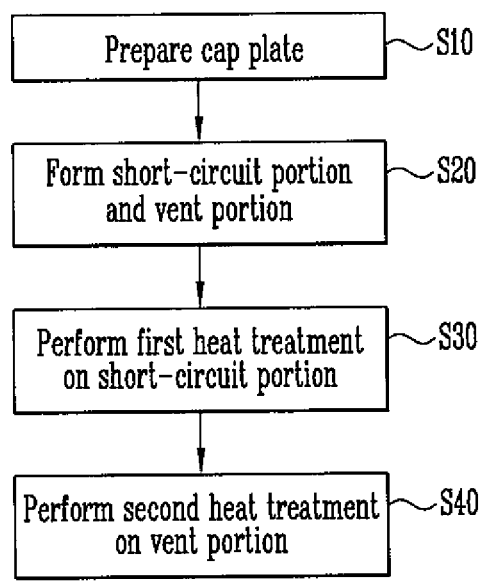
FIG. 4 is a flowchart showing a method of manufacturing a secondary battery according to an embodiment of the present invention.

FIG. 4 is a flowchart illustrating the method of manufacturing the secondary battery according to an embodiment of the present invention.

As shown in FIG. 4, the cap plate 151 is first prepared, which closes an opening of the case 140 that accommodates the electrode assembly 110 and has the opening at an end thereof (e.g., is open at a surface thereof), at act S10.

A plate made of an electric conductor is cut to have a shape corresponding to that of the opening of the case 140, thus providing the cap plate 151.

The cap plate 151 is formed of aluminum, and allows a high current to stably flow.

Next, the short-circuit portion 155 and the vent portion 154 are formed in a portion of the cap plate 151 prepared as such, at act S20.

The cap plate 151 prepared at act S10 undergoes any one process of casting, forging, rolling and pressing, thus forming the short-circuit portion 155 and the vent portion 154.

The short-circuit portion 155 and the vent portion 154 may be formed to be relatively thinner than the peripheral portion of the cap plate 151.

Subsequently, the short-circuit portion 155 (e.g., only the short-circuit portion 155) is subjected to the first heat treatment at act S30.

The short-circuit portion 155 formed at step S20 is subjected to the first heat treatment for 70 minutes or less (within 70 minutes) at the temperature of 400° C. to 500° C., in one embodiment at the temperature of 430° C. to 470° C., using (utilizing or by) the induction heating apparatus. In this context, if the temperature is less than 400° C., internal stress is not reliably removed, so that it is difficult to obtain a desired hardness. In contrast, if the temperature is more than 500° C., a crystal grain may be large, roughness may be high, and scale may be produced due to oxidation. Further, if the heat treatment time exceeds 70 minutes, aluminum may be lost due to oxidation. Therefore, in order to ensure the strength of 3 to 5 $kgf/cm^2$ (e.g., the strength of 4 $kgf/cm^2$), it is preferable to perform the first heat treatment within 70 minutes at the temperature of 400° C. to 500° C.

Finally, the vent portion 154 (e.g., only the vent portion 154) is subjected to a second heat treatment at act S40.

After the first heat treatment has been completed, the vent portion 154 formed at act S20 is subjected to the second heat treatment for 70 minutes or less (within 70 minutes) at the temperature of 200° C. to 300° C., in one embodiment, at the temperature of 270° C., using (utilizing) the induction heating apparatus. Here, if the temperature is less than 200° C., the internal stress is not reliably removed, so that it is difficult to obtain a desired hardness. In contrast, if the temperature is more than 300° C., a crystal grain may be large, roughness may be high, and scale may be produced due to oxidation. Further, if the heat treatment time exceeds 70 minutes, aluminum may be lost due to oxidation. Therefore, in order to ensure the strength of 6 to 8 $kgf/cm^2$, (e.g., the strength of 7 $kgf/cm^2$), it is preferable to perform the second heat treatment within 70 minutes at the temperature of 200° C. to 300° C.

The second heat treatment may be performed prior to the first heat treatment, unlike the above-described embodiment.

Alternatively, in one embodiment, the first heat treatment is performed currently (e.g., simultaneously) with the second heat treatment.

Figure 5A:
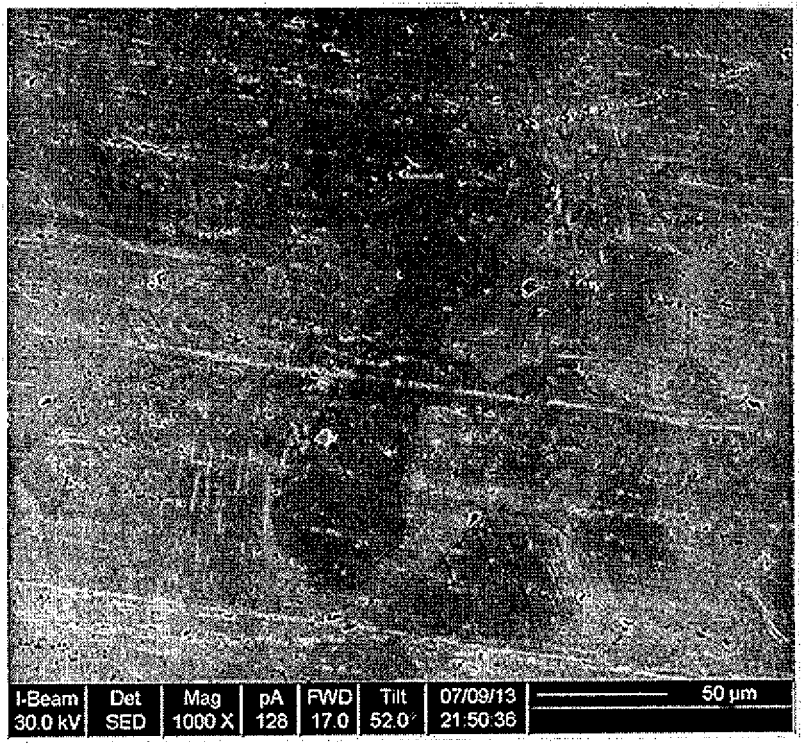
FIG. 5A is a photograph showing a vent portion that is subjected to heat treatment.
Figure 5B:
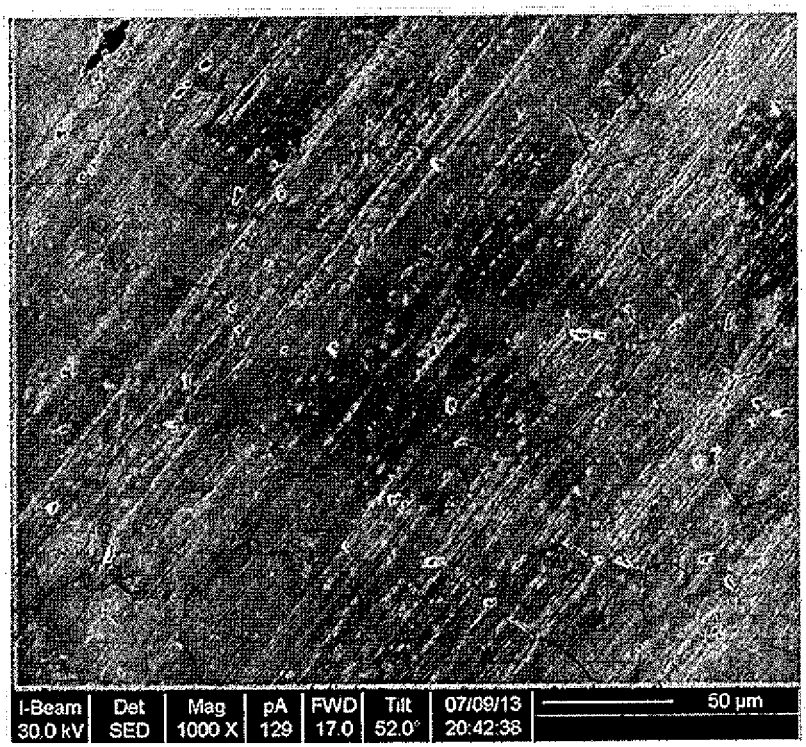
FIG. 5B is a photograph showing the vent portion that is not subjected to heat treatment.
Figure 6A:
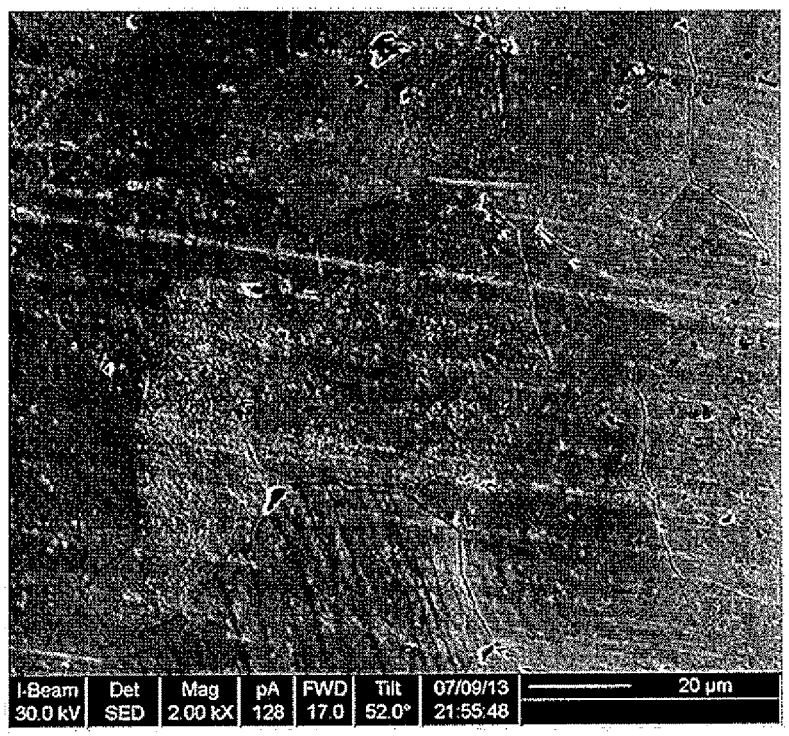
FIG. 6A is a photograph showing a short-circuit portion that is subjected to heat treatment.
Figure 6B:
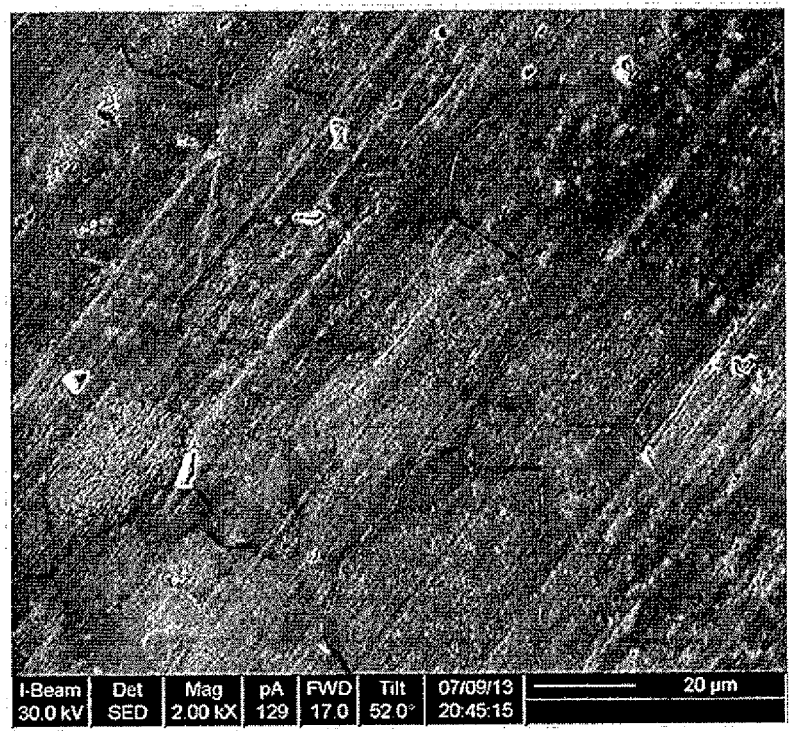
FIG. 6B is a photograph showing the short-circuit portion that is not subjected to heat treatment.

FIG. 5A is a photograph showing the vent portion that is, subjected to the heat treatment, FIG. 5B is a photograph showing the vent portion that is not subjected to the heat treatment, FIG. 6A is a photograph showing the short-circuit portion that is subjected to the heat treatment, and FIG. 6B is a photograph showing the short-circuit portion that is not subjected to the heat treatment.

If the first heat treatment and the second heat treatment have been completed as such, as shown in FIGS. 5A, 5B, 6A and 6B, the grain size of each of the short-circuit portion and the vent portion is increased as compared to the grain size of each of the short-circuit portion and the vent portion before the heat treatment is performed. That is, the grain size of each of the short-circuit portion and the vent portion is about 25 μm before the heat treatment, while the grain sizes of the short-circuit portion and the vent portion are about 70 μm and 50 μm, respectively, after the heat treatment. Further, a grain boundary may be reduced and internal energy may also be reduced, thus providing a more stable structure. Therefore, the short-circuit portion and the vent portion which are subjected to the heat treatment are relatively lower in hardness than the short-circuit portion and the vent portion which are not subjected to the heat treatment. For example, if the internal pressure of the battery becomes higher than the preset pressure, the short-circuit portion having relatively low hardness on the cap plate is deformed, thus causing the short circuit, and then the vent portion is broken, thus discharging the internal gas.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and equivalents thereof.

What is claimed is:

1. A secondary battery, comprising:
   an electrode assembly having a first electrode plate, a second electrode plate, and a separator between the first electrode plate and the second electrode plate;
   a case accommodating the electrode assembly therein, the case having an opening at an end thereof; and
   a cap plate closing the opening of the case, with a vent portion and a short-circuit portion formed in set portions of the cap plate,
   wherein the vent portion and the short-circuit portion are integrated with the cap plate.

2. The secondary battery of claim 1, wherein a grain size of each of the vent portion and the short-circuit portion is larger than that of a remaining portion of the cap plate except the vent portion and the short-circuit portion.

3. The secondary battery of claim 1, wherein the vent portion and the short-circuit portion are lower in hardness than a remaining portion of the cap plate except the vent portion and the short-circuit portion.

4. The secondary battery of claim 3, wherein the short-circuit portion has a hardness of 3 to 5 kgf/cm$^2$.

5. The secondary battery of claim 3, wherein the vent portion has a hardness of 6 to 8 kgf/cm$^2$.

6. The secondary battery of claim 1, wherein the vent portion and the short-circuit portion are formed by machining the cap plate and then performing a heat treatment.

7. The secondary battery of claim 6, wherein the heat treatment is performed by an induction heating apparatus.

8. The secondary battery of claim 6, wherein the heat treatment is performed only at the set portions of the cap plate.

9. A method of manufacturing a secondary battery, comprising:
   preparing a cap plate that closes an opening of a case, the case accommodating an electrode assembly therein and having the opening at an end thereof;
   forming a short-circuit portion and a vent portion on the cap plate;
   performing a first heat treatment on the short-circuit portion; and
   performing a second heat treatment on the vent portion.

10. The method of claim 9, wherein the short-circuit portion and the vent portion are formed by a process selected out from a group consisting of casting, forging, rolling and pressing.

11. The method of claim 9, wherein the first heat treatment and the second heat treatment are performed by an induction heating apparatus.

12. The method of claim 11, wherein the first heat treatment is performed for 70 minutes or less at a temperature of 400° C. to 500° C.

13. The method of claim 11, wherein the second heat treatment is performed for 70 minutes or less at a temperature of 200° C. to 300° C.

14. The method of claim 9, wherein the first treatment and the second heat treatment are only performed on the short-circuit portion and the vent portion, respectively.

15. The method of claim 9, wherein the first heat treatment is performed before the second heat treatment.

16. The method of claim 9, wherein the first heat treatment is performed after the second heat treatment.

17. The method of claim 9, wherein the first heat treatment is performed concurrently with the second heat treatment.

* * * * *